United States Patent [19]

Barrington

[11] 4,051,720

[45] Oct. 4, 1977

[54] ENGINE USEFUL LIFE MEASURING DEVICE

[75] Inventor: Clive Seymour Barrington, Bristol, England

[73] Assignee: Rolls-Royce (1971) Limited, Great Britain

[21] Appl. No.: 693,870

[22] Filed: June 8, 1976

[30] Foreign Application Priority Data

June 18, 1975 United Kingdom ............... 25879/75

[51] Int. Cl.$^2$ ............................................ G01M 15/00

[52] U.S. Cl. ...................................................... 73/116

[58] Field of Search .................. 73/117.3, 116, 133 R, 73/346

[56] References Cited

U.S. PATENT DOCUMENTS

| | | | |
|---|---|---|---|
| 3,035,443 | 5/1962 | Gray | 73/116 UX |
| 3,527,086 | 9/1970 | Evans et al. | 73/116 |
| 3,950,985 | 4/1976 | Buchwald et al. | 73/116 |

FOREIGN PATENT DOCUMENTS 1,247,293 9/1971 United Kingdom

*Primary Examiner*—Jerry W. Myracle

*Attorney, Agent, or Firm*—Stevens, Davis, Miller & Mosher

[57] ABSTRACT

The useful life of rotating machines is used up depending upon the load which the machine has to bear. In some machines it is necessary to measure the usage of the machine life and the present invention provides a device for doing this. In the described embodiment the device is applied to a gas turbine engine in which measurement of speed changes between certain speed levels is used to indicate the life usage.

5 Claims, 1 Drawing Figure

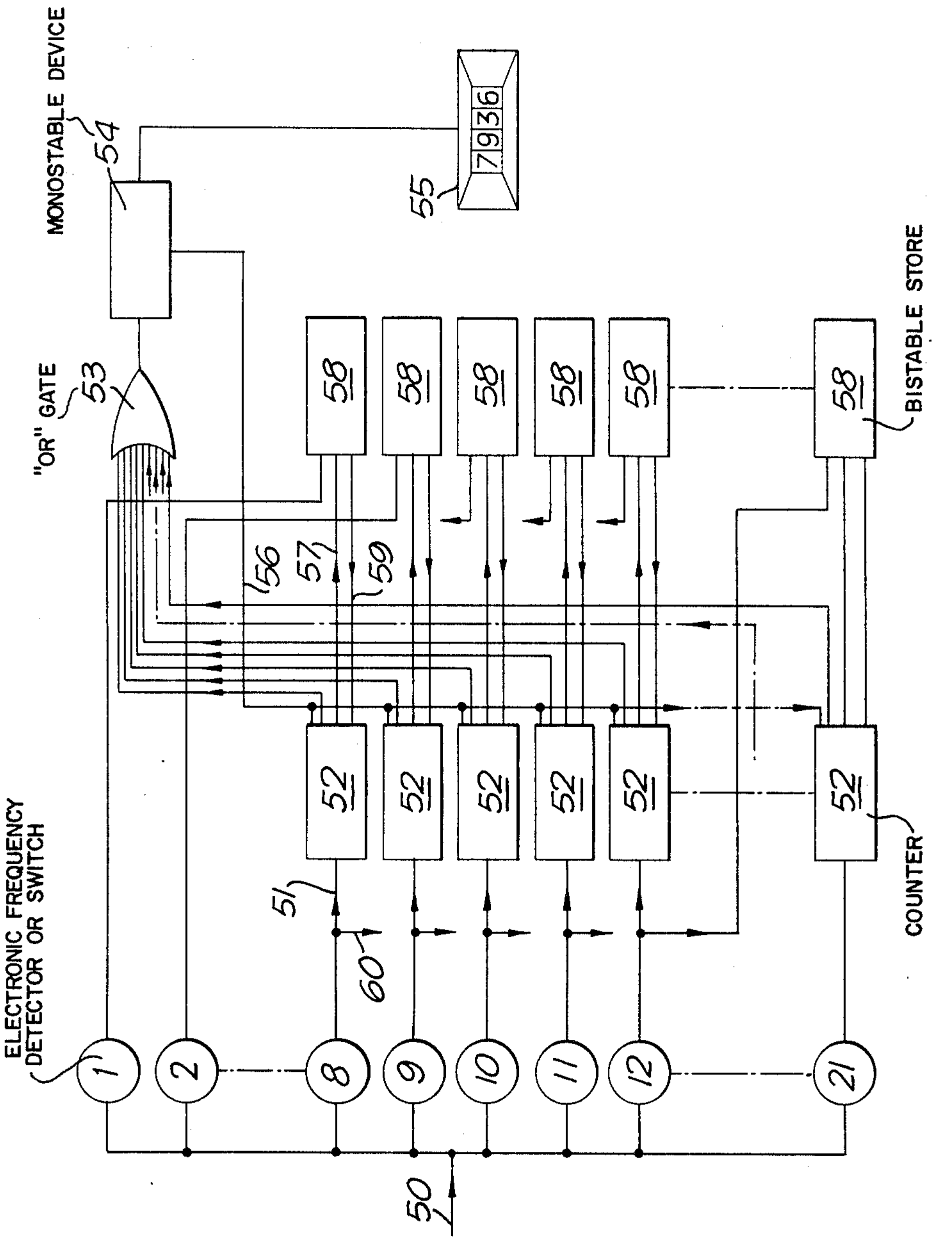
MONOSTABLE DEVICE
54
"OR" GATE
53
55
7936
58
BISTABLE STORE
56
57
59
52
COUNTER
51
60
ELECTRONIC FREQUENCY DETECTOR OR SWITCH
1
2
8
9
10
11
12
21
50

ENGINE USEFUL LIFE MEASURING DEVICE

There are a number of factors which affect the rate at which the useful life of a rotating machine is used up, one of which is the speed at which it is operated.

With stationary rotating machines such as electric motors which have constant loads, the life can be measured in or quoted as a number of operating hours. With other machines where the load varies, certain parts of the machine receive varying stresses which stress machine components cyclically as the load varies and the number of stress cycles which the machine receives becomes a more important constraint on the useful life than the actual number of operating hours.

For certain rotating machinery there is a pre-determined life at the end of which certain parts have to be replaced because of fatigue caused by cyclic stress. This is referred to as damage caused by low cycle fatigue, the term "low cycle" referring to the very low frequency of the stress cycles. One such machine is the aero gas turbine engine and in such engines the useful life of components is used up by low cycle fatigue damage. The present invention is embodied in a device which gives a measure of this damage derived from recordings of the speeds at which the engine is operated. By empirical measurement, confirmed by stress analysis, a series of speed ranges has been determined for which there can be allocated a measure of the useful life of gas turbine engines, when changes between these levels take place. This discovery is clearly applicable to other rotating machinery particularly to machines which suffer cyclic stress related to speed changes but the same kind of analysis and consequent measurement of used life can be made in relation to temperature or other load variations.

According to the present invention there is provided a device for measuring the use of the useful life of a rotating machine, comprising means for generating a signal having a characteristic related to a load variation of the machine, a plurality of detectors each responsive to a different level of said characteristic of said signal, means for generating a count which means is associated with said detectors and arranged to generate a count when the characteristic of said signal changes between predetermined levels of said characteristic consequent upon a corresponding machine load change, and means for summating successive counts generated by said means thereby to give an indication of the usage of said useful life.

An embodiment of the invention will now be described, with reference to the accompanying drawing, which is a diagrammatic representation of the circuit of a device constructed in accordance with the present invention.

The drawing shows a counting system which has twenty-one input channels all connected to an input line 50 which receives a pulsed electrical signal of a frequency related to the speed of rotation of the rotary element of a rotating machine whose usage of its useful life is being determined. The machine is not shown. The frequency of the signal varies with the engine speed. Each of the twenty-one counters comprises an electronic frequency switch (numbered 1 to 21 inclusive) adapted to respond to a given frequency level. Each of the twenty-one counters responds to a different frequency and the frequencies are respectively selected to correspond to the percentages of engine speed shown below.

TABLE A

| Level | %RPM | Count | Resets Level |
|---|---|---|---|
| 1 | 10 | No | 8 |
| 2 | 20 | No | 9 |
| 3 | 30 | No | 10 & 11 |
| 4 | 40 | No | 12 |
| 5 | 50 | No | 13 |
| 6 | 55 | No | 14 |
| 7 | 60 | No | 15 |
| 8 | 65 | Yes | 16 |
| 9 | 70 | Yes | 17 |
| 10 | 75 | Yes | 18 & 19 |
| 11 | 80 | Yes | 20 |
| 12 | 85 | Yes | 21 |
| 13 | 88 | Yes | — |
| 14 | 90 | Yes | — |
| 15 | 95 | Yes | — |
| 16 | 97.5 | Yes | — |
| 17 | 100 | Yes | — |
| 18 | 101 | Yes | — |
| 19 | 102 | Yes | — |
| 20 | 103.5 | Yes | — |
| 21 | 105 | Yes | — |

Thus when the engine starts and reaches 10% r.p.m. electronic frequency detector or switch 1 is activated. As the engine speed rises further so each of the electronic frequency switches 2, 3, 4, etc. becomes in turn activated as the speed reaches the frequency level of the switch. While the speed remains above the speed level of each switch it remains activated.

When the engine reaches 65% r.p.m. electronic frequency switch 8 is activated and this switch is connected through a line 51 to a bistable counter 52 and each of the succeeding switches up to switch 21 has a corresponding counter 52 connected to it. By contrast the first seven switches, which make up one set of switches, do not have such counters. Switches 8 to 21 make up a second set of switches.

Thus, when the speed reaches the range of electronic frequency switch 8 its counter 52 is activated and a count pulse is passed to an "OR" gate 53 and through a monostable device 54 to an electro-mechanical indicator 55 to record a count of one. When the monostable device 54 is actuated by the passage of the count pulse, a counter reset pulse is initiated through line 56 to reset the counter 52 of switch 8 so as to return it to its initial condition ready to perform a further count. However, when the count pulse is initiated by the counter 52 it also passes via line 57 to a bistable store 58. The count pulse causes the store 58 to change to its second state in which it sends out a counter inhibit signal along line 59 to the respective counter 52 and this prevents this counter 52 from counting again until the inhibit signal is removed. Each of counters 8 to 21 inclusive has its respective bistable store 58 and each is connected to line 56 to receive each counter reset pulse.

As the speed increases further successive switches 9, 10 etc. become activated and counts are initiated by the respective counters 52, passed through the "OR" gate 53 and monostable device 54, for each to add a further count of one to indicator 55. However, the respective counter inhibit signals prevent further counting by these switches until the inhibit signals have been removed.

Let it now be assumed that the speed increases to 100% (level 17), which is the design speed of the engine shaft. While the speed remains at this level no further counting takes place and, if the speed then falls, each of the switches 16,15,14 etc. will successively de-activate as the speed falls below its speed level. The lower switches which are still activated will still be inhibited from passing a count. Referring now to Table A it will be seen that each of switches 1 to 12 has a reset level attributed to it. This means that after the engine speed has accelerated to a particular level it has to drop again to the corresponding reset level before further counting occurs. In the example of the speed having first accelerated to 100% (level 17) the speed must then fall below 70% (level 9) so as to de-activate switch 9 and cause counter 17 to be reset and the counter inhibit signal removed from it before counter 17 can perform a further count. If the speed only falls just below 70% before accelerating to 100% again only counter 17 will be reset and only counter 17 will count. Resetting is achieved by each switch transmitting a store reset signal as it is de-activated. For example, switch 12 emits a store reset signal as it is de-activated, along line 60 which operates on the bistable store 58 of switch 21 and returns that store 58 to its original state in which it ceases to transmit a counter inhibit signal to switch 21. Switch 21 is then ready to count again on the next acceleration to 105% r.p.m. Each of switches 1 to 12 has this store resetting facility and they are connected as shown in Table A: switches 1 to 7, in fact, only perform a resetting function as they do not count.

Reference to Table A shows that the counters 8 to 21 inclusive, which are the counters of the second set and which perform the counting operation, are reset by the speed of the engine falling to the speed ranges below which counters 1 to 12 are de-activated, in the manner set out in Table A. To take another example, when the engine is started, if it is run up to 105% (level 21) of the design speed, counting starts at level 8 and fourteen counts are made up to level 21. If the speed subsequently reduces but stays at or above 88% (level 13) no further counting takes place. If then the speed is reduced, for example to just below 50%, counters 13 to 21 are reset and a subsequent increase to 100% will add a count of five from counters 13 to 17 inclusive. When the engine is shut down all of counters 8 to 21 are reset but if the engine speed is only slowed, for example to just below 30% (level 3) before accelerating again, counters 8 and 9 will not be reset and the count will start at 75% (level 10) as speed increases. Final shut down of the engine ensures that all counters are reset ready to count again on engine start up.

In the design of the life counting system account has been taken of the stress applied to the engine and the work performed by it in passing from one speed level to another and the speed levels have been selected both as to actual level and separation from adjacent levels, so as to reflect the way in which the useful life is used up as changes between different pairs of speed levels occur. The counting device eliminates calculation and gives a simple indication in numerical fashion of the life of an engine between overhauls. For example, the number 7936 is shown on indicator 55 and a major overhaul of the engine can be given to the operator of the engine as being required when the number 8000 has been counted. As an alternative the indicator 55 could be an entirely electronic readout device.

Although the device described measures only the parameter of speed, the principle of measurement could be applied to any other parameter which places a constraint upon the life of a rotating machine. Additionally, two parameters could be taken into account, for example temperature as well as speed, by superimposing a temperature count upon the speed count and making the counts additive.

I claim:

1. A device for measuring the use of the useful life of a rotating machine, comprising means for generating a signal having a characteristic related to a variable load of the machine; a plurality of detectors each responsive to a different level of said characteristics of said signal, the said detectors comprising a first set of detectors which respond to lower levels of said characteristic and a second set of detectors which respond to higher levels of said characteristic, the means for generating the count being associated only with the second set of detectors; means for generating a count which means is associated with said detectors and arranged to generate a count when the characteristic of said signal changes between predetermined levels of said characteristic consequent upon a corresponding machine load change; and means for summating successive counts generated by said means thereby to give an indication of the usage of said useful life.

2. A device according to claim 1, comprising means for inhibiting counting connected to each of the detectors of the second set, which inhibiting means are arranged to become effective after a count has been generated to inhibit the generation of a further count in respect of said detector until the load has dropped to below a pre-determined level.

3. A device according to claim 2, wherein one of said detectors is arranged to detect said pre-determined load level and said one detector includes means for removing the count inhibit from the first-mentioned detector upon the load falling below said pre-determined level.

4. A device according to claim 3, wherein the detectors of the first set each include said means for removing the count inhibit.

5. A device according to claim 1, wherein the load variation of the machine is the machine speed and the signal is an electrical voltage and its characteristic is its voltage level.

* * * * *